Nov. 18, 1924.
W. C. BUCKNAM
1,516,078
TORCH
Filed June 9, 1921
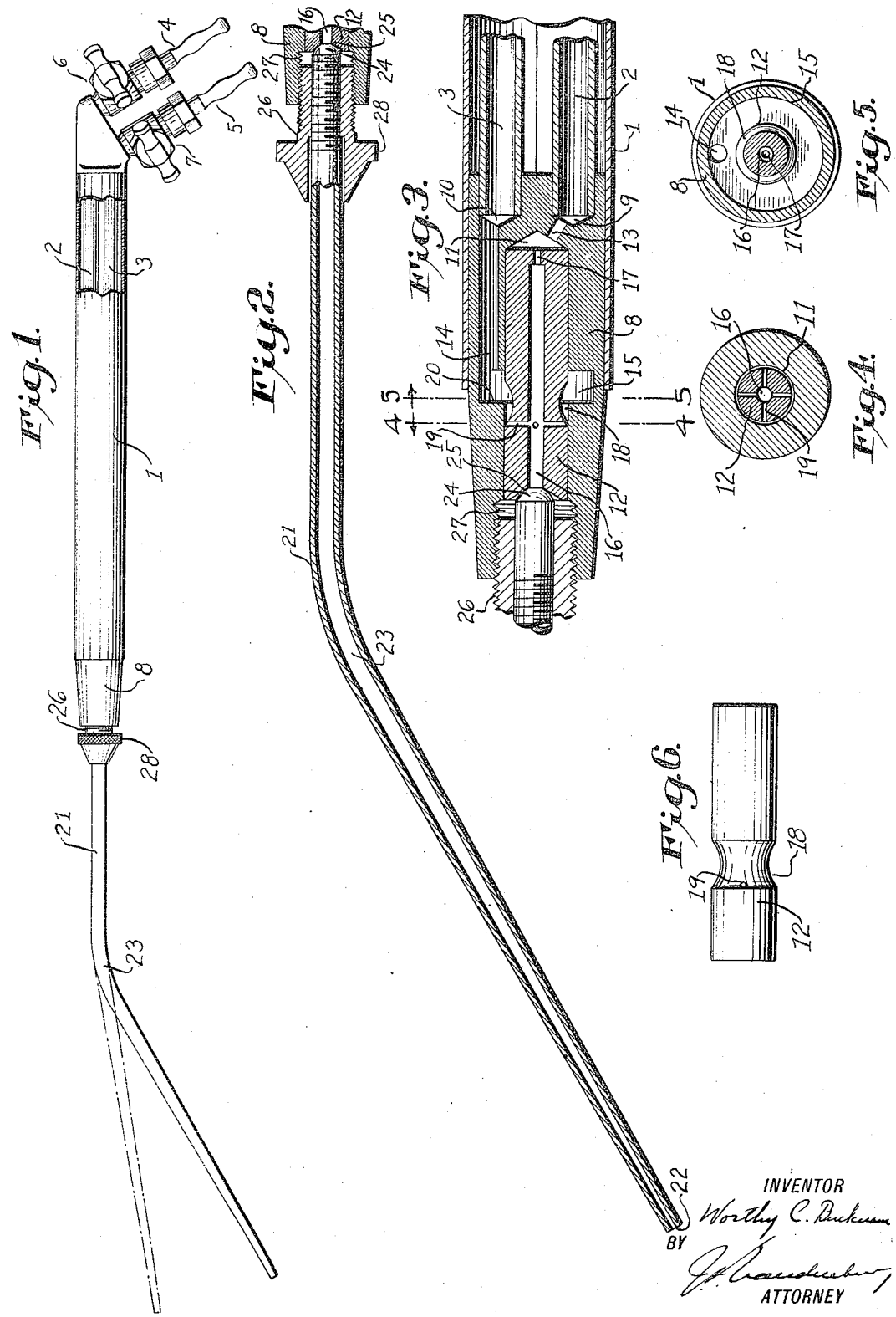

Patented Nov. 18, 1924.

1,516,078

UNITED STATES PATENT OFFICE.

WORTHY C. BUCKNAM, OF JERSEY CITY, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

TORCH.

Application filed June 9, 1921. Serial No. 476,122.

*To all whom it may concern:*

Be it known that I, WORTHY C. BUCKNAM, a citizen of the United States, and a resident of Jersey City, in the county of Hudson and State of New Jersey, have invented a new and useful Torch, of which the following is a specification.

The invention is an improvement in oxyacetylene or like torches used for welding and cutting metals, and a particular object is to provide a welding torch which shall be of simple, accurate and comparatively inexpensive construction and which shall be adapted for use in any location. Another object is to provide an improved mixer in the head or body or the torch, whereby a fixed ratio of the gases is insured, leakage is prevented, and the distribution of acetylene through the lateral ports is equalized.
Other objects and features will become apparent as the specification proceeds.

In the accompanying drawings forming a part hereof:

Fig. 1 is a side elevation of a torch embodying the invention, a portion of the handle casing being broken away and the capacity of the tip for bending being illustrated by two positions in full and dotted lines;
Fig. 2 is a longitudinal section on an enlarged scale through the forward portion of the head and the tip, the rear portion of the tip within the coupling being shown in elevation;
Fig. 3 is a longitudinal section on a still larger scale through the head of the torch, showing the rear portion of the tip in elevation;

Figs. 4 and 5 are cross-sections on the lines 4—4 and 5—5, respectively, of Fig. 3; and Fig. 6 is an elevation of the mixer plug.

A tubular casing 1, forming a handle, encloses pipes 2, 3 for conducting the oxygen and acetylene from the rear connections 4, 5. Customary valves 6, 7 enable the flow of the two gases to be regulated.

A cylindrical block or head 8, the projecting portion of which may be tapered, is inserted and secured in the forward end of the casing 1. The forward ends of the pipes 2, 3 are secured in sockets 9, 10 in the rear end of this block. A central lonigtudinal cavity 11 is formed in the said block for the reception of an elongated mixer plug 12, which is forced into the cavity with a driving fit. The oxygen pipe 2 communicates with the rear end of the cavity 11 by a channel 13, while the acetylene from the pipe 3 flows through a longitudinal channel or bore 14 in the head block at one side of the cavity, the said bore 14 terminating in an annular chamber 15 formed in the side of the cavity intermediate its ends.

The mixer plug 12 is formed with a longitudinal bore or mixing chamber 16 having at the rear end a constricted oxygen metering port 17, through which the oxygen is admitted from the channel 13 by way of the rear end of the cavity 11. Intermediate its ends the mixer plug has an external annular groove or chamber 18, which communicates with the side chamber 15 in the head. From the chamber 18 a plurality of lateral acetylene metering ports 19 extend inward to intersect the mixing chamber 16. The longitudinal acetylene duct 14 delivers the acetylene toward the forward wall 20 of the chamber 15 in the head, which wall acts as a baffle and may be substantially perpendicular to the duct 14, as shown. The acetylene then enters the external annular chamber 18 of the mixer plug, and finally through the ports 19 reaches the mixing chamber 16. The annular chamber 18, it will be noted, overlaps or extends forward from the chamber 15, and the acetylene ports extend inward preferably from its extreme forward portion at points in advance of the chamber 15. By this construction the acetylene is distributed equally to and through the several acetylene ports, avoiding any unstable or unbalanced condition which may result in cases where the acetylene tends to flow more strongly through one or more of the ports than through others. The tight driving fit of the mixer plug in the cavity of the head insures perfect gas barriers at both sides of the lateral acetylene passages, preventing all leakage between the oxygen and acetylene around the rear portion of the plug or between the acetylene and the atmosphere around the forward portion.

The tip 21 comprises a long narrow flexible walled copper tube, which can be bent by the user in any direction. This tube is swaged down toward the forward end to produce the requisite flame orifice 22, leaving a relatively enlarged supply chamber or secondary or continuation mixing chamber 23 through the body or major portion of the tip, which permits the tip to be bent without interfering with the flow of the mixed gases so as to cause flashbacks. The reduction of the forward part of the tip to the desired flame orifice being effected by swaging, the thickness of the walls remains the same, while the area of the passage is diminished. The reduction is preferably gradual as from about the central portion of the tip onward as shown, but this can be otherwise.

The rear extremity of the tip is formed with a rounded seat 24, which forms a tight joint when pressed against a concavity 25 in the forward end of the mixer plug 12, so that the mixed gases pass directly from the primary mixing chamber 16 to the secondary mixing chamber or longitudinal passage of the tip. The tip is detachably coupled to the projecting portion of the head by means of a nut or bushing 26 on the rear portion of the tip, which screws into an internally-threaded enlarged chamber 27 of the head. The nut is preferably secured to the tip by being screwed tightly thereon, and is provided with a knurled rim 28, by means of which it is screwed into and out of the head to couple and uncouple the tip and to make and break the leak-tight joint at the seat 24 and the concavity 25. A number of the removable tips having interchangeable rear ends, and of different lengths and of different sizes of flame orifice, can be used with each torch body. The long flexible tip capable of being bent in any desired manner, enables the welder to operate to the best advantage under any conditions.

I claim:

1. An oxyacetylene or like welding torch, having supply conduits for the separate gases, a head formed with a longitudinal cavity having an annular side chamber intermediate its ends, the cavity having communication toward the rear with one of the conduits, and a mixer-plug fitting said cavity and having a longitudinal passage and a plurality of lateral passages opening into the longitudinal passage and supplied from said annular chamber in the head, the head being further formed with a longitudinal channel leading from the other conduit at one side of the cavity and delivering into said annular chamber toward the forward wall thereof.

2. In an oxyacetylene or like torch, a head having a cavity and separate supply passages leading to the rear of said cavity and to a point farther out on the side thereof, respectively, a mixer-plug having intercommunicating longitudinal and lateral passages, and a removable tip, said mixer-plug being permanently inserted in the cavity of the head with a tight driving fit affording gas barriers at both sides of the lateral passages.

3. An oxyacetylene or like welding torch, having supply conduits for the separate gases, a head formed with a longitudinal cavity having a side chamber intermediate its ends, the cavity having communication toward the rear with one of the conduits and the side chamber having communication with the other conduit, and a member fitting said cavity and having a longitudinal passage and a plurality of lateral passages opening into the longitudinal passage, said member being further provided with an external annular chamber intermediate its ends in communication with and extending forward from the chamber in the head, the lateral passages of the member being positioned so as to lead from said external annular chamber at points in advance of the side chamber of the head.

WORTHY C. BUCKNAM.